(12) United States Patent
Lim

(10) Patent No.: US 8,390,690 B2
(45) Date of Patent: Mar. 5, 2013

(54) DYNAMIC RANGE EXTENDING METHOD AND APPARATUS USING SUBSAMPLING

(75) Inventor: Yong Lim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 764 days.

(21) Appl. No.: 12/453,335

(22) Filed: May 7, 2009

(65) Prior Publication Data
US 2010/0007778 A1    Jan. 14, 2010

(30) Foreign Application Priority Data

Jul. 8, 2008 (KR) ........................ 10-2008-0066184

(51) Int. Cl.
*H04N 5/225* (2006.01)
*H04N 3/14* (2006.01)

(52) U.S. Cl. ..................................... 348/216.1; 348/296
(58) Field of Classification Search .................. 348/294, 348/296, 297, 302, 308, 216.1
See application file for complete search history.

(56) References Cited

U.S. PATENT DOCUMENTS

| 4,709,259 | A  | * | 11/1987 | Suzuki ........................... 348/280 |
| 6,665,010 | B1 | * | 12/2003 | Morris et al. ................. 348/297 |
| 6,903,770 | B1 | * | 6/2005  | Kobayashi et al. ........... 348/296 |
| 6,972,800 | B2 |   | 12/2005 | Sano et al. |
| 7,450,782 | B2 |   | 11/2008 | Lim et al. |
| 7,489,352 | B2 | * | 2/2009  | Nakamura ..................... 348/296 |
| 2005/0151866 | A1 | * | 7/2005 | Ando et al. .................... 348/297 |
| 2006/0033823 | A1 |   | 2/2006 | Okamura |

FOREIGN PATENT DOCUMENTS

| JP | 2001-197362 A | 7/2001 |
| JP | 2002-044515 A | 2/2002 |
| JP | 2004-120205 A | 4/2004 |
| KR | 10-2005-0022748 A | 3/2005 |

* cited by examiner

*Primary Examiner* — Timothy J Henn
(74) *Attorney, Agent, or Firm* — Lee & Morse, P.C.

(57) ABSTRACT

A method and apparatus subsampling a plurality of signals from one frame of a pixel array, pixels within the pixel array belonging to one of at least two sets, each set configured to sense values of a same image parameter, includes controlling integration times for first and second signals for each set output from the pixel array, controlling including using a first integration time for the first signal of the set and using a second integration time, different than the first integration time, for the second signal of the set, and calculating a synthesized value for each set using the first and second signals having different integration times.

21 Claims, 15 Drawing Sheets

FIG. 12A, FIG. 12B, FIG. 12C, FIG. 12D, FIG. 12E, FIG. 12F, FIG. 12G

DYNAMIC RANGE EXTENDING METHOD AND APPARATUS USING SUBSAMPLING

BACKGROUND

1. Technical Field

Embodiments are directed to a dynamic range extending method and apparatus using subsampling.

2. Description of Related Art

One metric of a sensor used in imaging is dynamic range, i.e., a ratio of the largest possible signal to the smallest possible signal that can be generated by the sensor. The largest possible signal is directly proportional to the full well capacity of the pixel. The smallest possible is the noise level when no light is incident on the sensor, i.e., the "noise floor" of the sensor. Imaging systems using sensors having a large dynamic range can record both shadow detail and highlight detail.

There are several known techniques for widening the dynamic range of a sensor, each with its own advantages and drawbacks. One such technique includes image synthesizing using averaging, in which multiple frames are exposed using different integration times, e.g., a long integration time and a short integration time. These frames are then averaged to provide a synthesized image. However, such a technique requires an additional frame memory and an expensive sensor, while providing a low frame rate.

SUMMARY

Embodiments are therefore directed to a dynamic range extending method using subsampling and an apparatus using the same, which substantially overcome one or more of the problems due to the limitations and disadvantages of the related art.

A subsampling method and apparatus according to an embodiment may use more than one integration time within one frame.

At least one of the above and other advantages may be realized by providing a method of subsampling a plurality of signals from one frame of a pixel array within one frame, pixels within the pixel array belonging to one of at least two sets, each set being configured to sense valued of same image parameter, the method including controlling integration times for first and second signals for each set output from the pixel array, controlling including using a first integration time for the first signal of the set and using a second integration time, different than the first integration time, for the second signal of the set, and calculating a synthesized value for each set using the first and second signals having different integration times.

Each pixel may include a plurality of sub-pixels. At least two sub-pixels within a single pixel may have different integration times. Controlling may include controlling whether sub-pixels within each pixel have a same or different integration times in accordance with a dynamic range of an image incident on the pixel array.

The first signal of the first set may be output from a first sub-pixel and the second signal of the first set may be output from a second sub-pixel. The first and second signal sub-pixels may be within a same pixel.

The first signal is output from may be output from a first pixel and the second signal may be output from a second pixel.

Controlling the integration time may include selecting an integration time for each individual pixel. Controlling the integration time may include selecting an integration time for each row or column in the pixel array.

Signals within each set may be output from nearest portions of the pixel array.

Calculating may include averaging the first and second signals. Averaging may include weighted averaging.

Controlling may include using a third integration time for a third signal for each set, the third integration time being different than the first and second integration times.

The method may include controlling a ratio of signals sampled using the first integration time to signals sampled using the second integration time. Controlling the ratio may be determined in accordance with a dynamic range of an image incident on the pixel array.

Controlling the integration time may include altering at least one of the first and second integration times in accordance with a dynamic range of an image incident on the pixel array.

The image parameter may be color, wherein the first set is a first color and the second set is a second color different from the first color.

At least one of the above and other advantages may be realized by providing an imaging apparatus including an array of pixels configured to output a plurality of signals within one frame, pixels within the pixel array belonging one of at least two sets, each set being configured to sense values of a same image parameter, and a controller configured to generate a synthesized value from first and second signals for each set output from the pixel array, generation of the synthesized value includes using a first integration time for the first signal, using a second integration time, different than the first integration time, for the second signal, and calculating a sub-sampled value for each set from the first and second signals having different integration times for each set.

Each pixel includes a plurality of subpixels. At least two sub-pixels within a single pixel have different integration times. The controlling may be configured to control whether sub-pixels within each pixel have a same or different integration times in accordance with a dynamic range of an image incident on the pixel array.

The first signal of the first set may be output from a first sub-pixel and the second signal of the first set may be output from a second sub-pixel. The first and second signal sub-pixels are within a same pixel.

The first signal may be output from a first pixel and the second signal may be output from a second pixel.

The controller may be configured to select an integration time for each individual pixel. The controller may be configured to select an integration time for each row or column in the pixel array.

Signals within each set may be output from nearest portions of the pixel array.

The controller may be configured to average the first and second signals. The controller may be configured to generate a weighted average the first and second signals.

The controller may be configured to use a third integration time for a third signal for each set, the third integration time being different than the first and second integration times.

The controller may be configured to control a ratio of signals sampled using the first integration time to signals sampled using the second integration time. The controller may be configured to control the ratio is in accordance with a dynamic range of an image incident on the pixel array.

The controller may be configured to alter at least one of the first and second integration times in accordance with a dynamic range of an image incident on the pixel array.

The image parameter may be color, wherein the first set is a first color and the second set is a second color different from the first color.

At least one of the above and other advantages may be realized by providing an image sensor including a pixel array configured to output a plurality of signals within one frame, pixels within the pixel array belonging one of at least two sets, each set being configured to sense values of a same image parameter, a controller configured to generate a synthesized value from first and second signals for each set output from the pixel array, generation of the synthesized value includes using a first integration time for the first signal, using a second integration time, different than the first integration time, for the second signal, and calculating a sub-sampled value for each set from the first and second signals having different integration times for each set, and an analog to digital converter configured to receive the synthesized value from the controller and to output corresponding digital signal.

The image sensor may be a CMOS image sensor or a CCD image sensor.

At least one of the above and other advantages may be realized by providing a system including a processor, a memory device in communication with the processor, and an image sensor in communication with at least one of the processor and the memory device. The image sensor may include a pixel array configured to output a plurality of signals within one frame, pixels within the pixel array belonging one of at least two sets, each set being configured to sense values of a same image parameter, a controller configured to generate synthesized value from first and second signals for each set output from the pixel array, generation of the synthesized value includes using a first integration time for the first signal, using a second integration time, different than the first integration time, for the second signal, and calculating a sub-sampled value for each set from the first and second signals having different integration times for each set, and an analog to digital converter configured to receive synthesized value from the controller and to output a corresponding digital signal to the one of the processor and memory device.

BRIEF DESCRIPTION OF THE DRAWINGS

The above and other features and advantages will become more apparent to those of ordinary skill in the art by describing in detail example embodiments with reference to the attached drawings in which:

FIGS. 12A to 12G illustrate alternative arrangements of color patterns and integrations times according to embodiments;

DETAILED DESCRIPTION

Korean Patent Application No. 10-2008-0066184, filed on Jul. 8, 2008, in the Korean Intellectual Property Office, and entitled: "DYNAMIC RANGE EXTENDING METHOD AND APPARATUS USING SUBSAMPLING" is incorporated by reference herein in its entirety.

Embodiments will now be described more fully hereinafter with reference to the accompanying drawings. The invention may, however, be embodied in different forms and should not be construed as limited to the embodiments set forth herein. Rather, these embodiments are provided so that this disclosure will be thorough and complete, and will fully convey the scope of the invention to those skilled in the art.

In embodiments discussed in detail below, multiple exposures may be realized using subsampling within a single frame. A frame as used herein is a complete picture.

Subsampling may include selection of a single value among a plurality of values in a region or may average the plurality of values within the region. Subsampling using averaged values may include analog vertical averaging, in which quantization occurs after averaging, and digital vertical averaging, in which quantization occurs for each value during averaging, as well as after averaging. In analog vertical averaging, each value in a group, e.g., a row, may be sampled and held, averaged, and then converted to a digital signal. In digital vertical averaging, each value in a group, e.g., a row, may be sampled and held, converted to a digital signal, and then averaged.

In further detail, in accordance with embodiments, subsampling groups may be row by row, rows by rows, pixel by pixel, pixels by pixels, and so forth, with different integration times for the groupings. In other words, image synthesizing according to embodiments may be realized within a frame, i.e., not requiring two separate frames.

Figure 1:
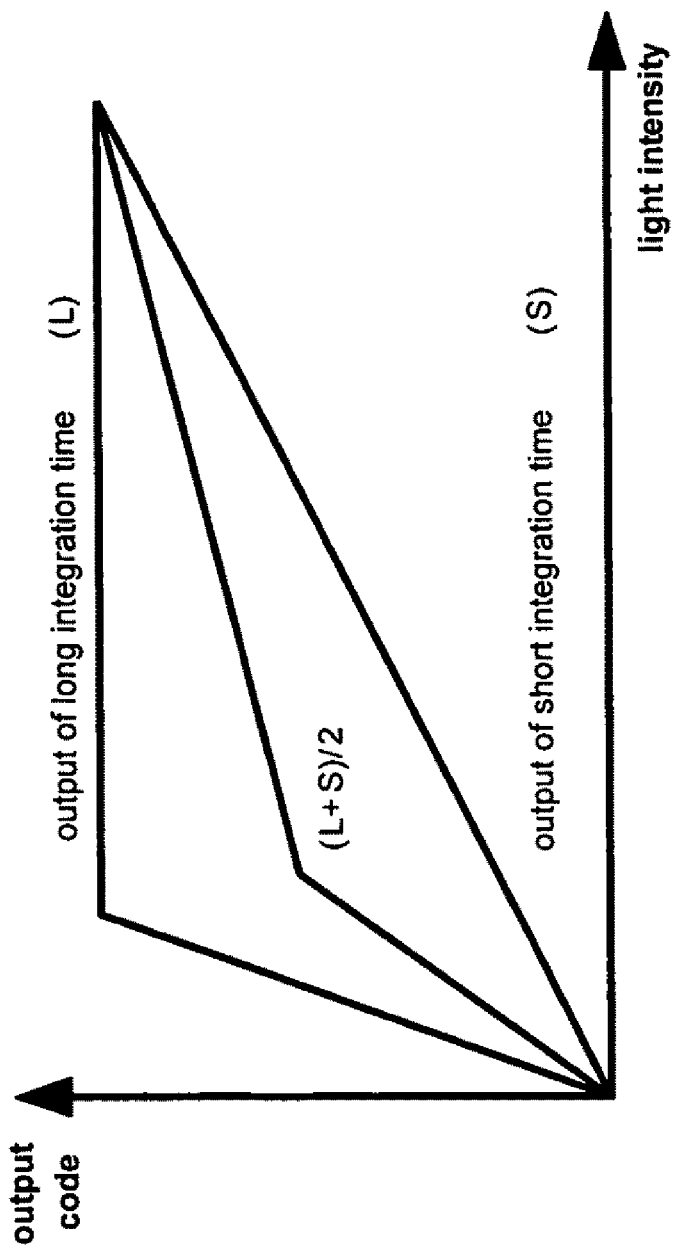
FIG. 1 illustrates image synthesis according to an embodiment.

FIG. 1 illustrates image synthesis using averaging of two different integration times, e.g., a long integration time (LIT) and a short integration time (SIT). The dynamic range may controlled in accordance with the ratio of pixels sampled using a LIT and those sampled using a SIT.

The averaging may be realized in either an analog or digital domain. The analog domain may allow pixel averaging or readout averaging. The digital domain may allow a knee point in the response curves to be traced and may allow weighted synthesis. Such weighted synthesis may include individually controlling the resolution and/or gain of the signals having different integration times.

Figure 2:
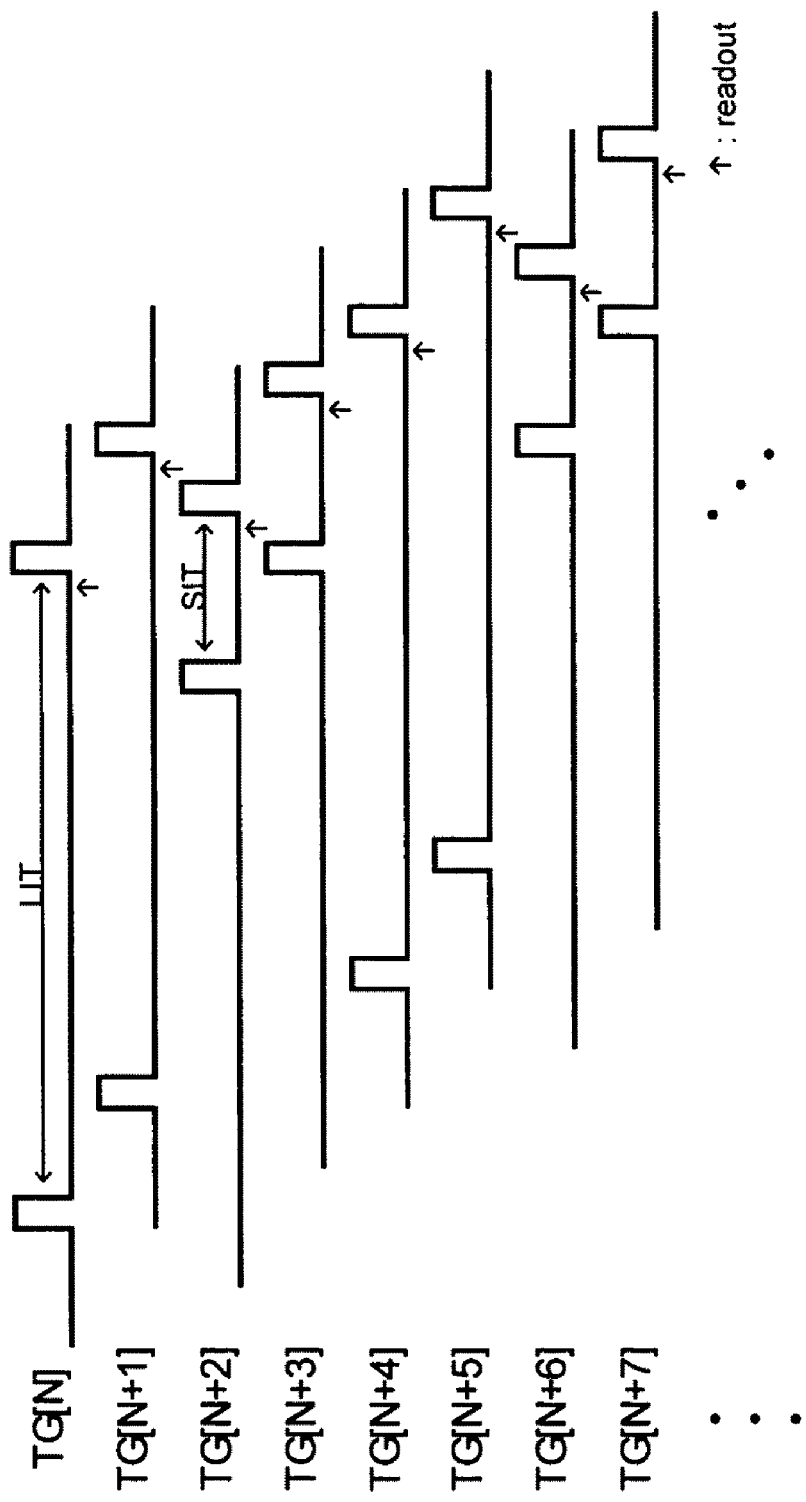
FIG. 2 illustrates row by row subsampling according to an embodiment.

An example of row by row subsampling using a LIT and a SIT, assuming the use of a mosaic pattern, e.g., a Bayer pattern, is illustrated in FIG. 2. As shown therein, an output of a transistor gate (TG) of pixels may be sampled for different integration times, e.g., in alternating groups having two rows each. These outputs having different integration times may then be averaged.

Figure 3:
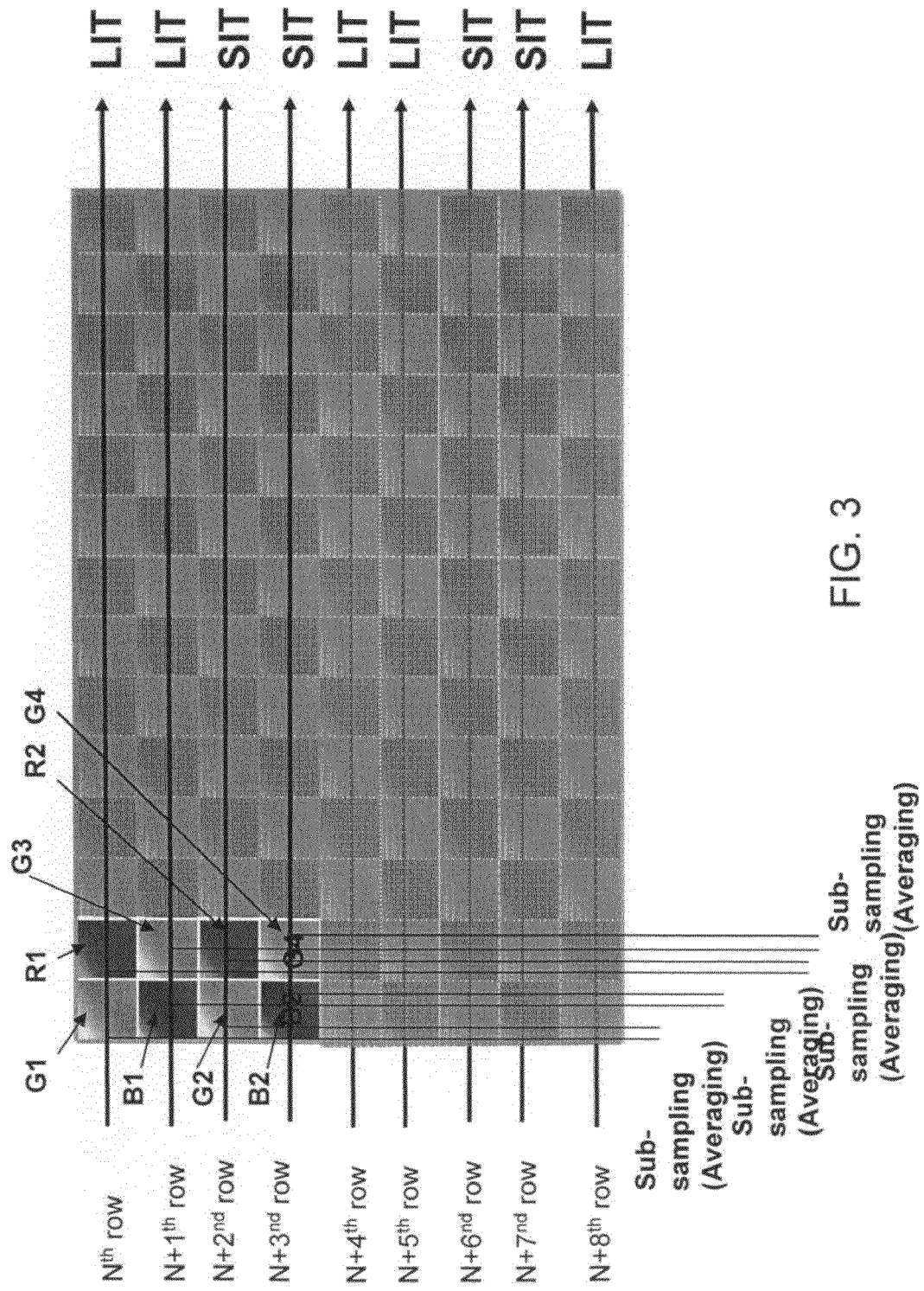
FIG. 3 illustrates row by row subsampling in a Bayer pattern according to an embodiment.

Further details of row by row subsampling for a Bayer pattern are illustrated in FIG. 3. As can be seen therein, nearest pixels having the same color in different rows and different integration times may be averaged. For example, a first green pixel G1 in the $N^{th}$ row having a LIT and a second green pixel G2 in the $N+2^{nd}$ row having a SIT may be averaged. Similar averaging may be realized for the blue, red and second green pixels, the two green, one red and one blue pixels forming a Bayer pattern. While 2*2 subsampling is illustrated in FIG. 3, more than two rows may be sampled at once, e.g., 3*3, 4*4, etc., subsampling may be used.

Figure 4:
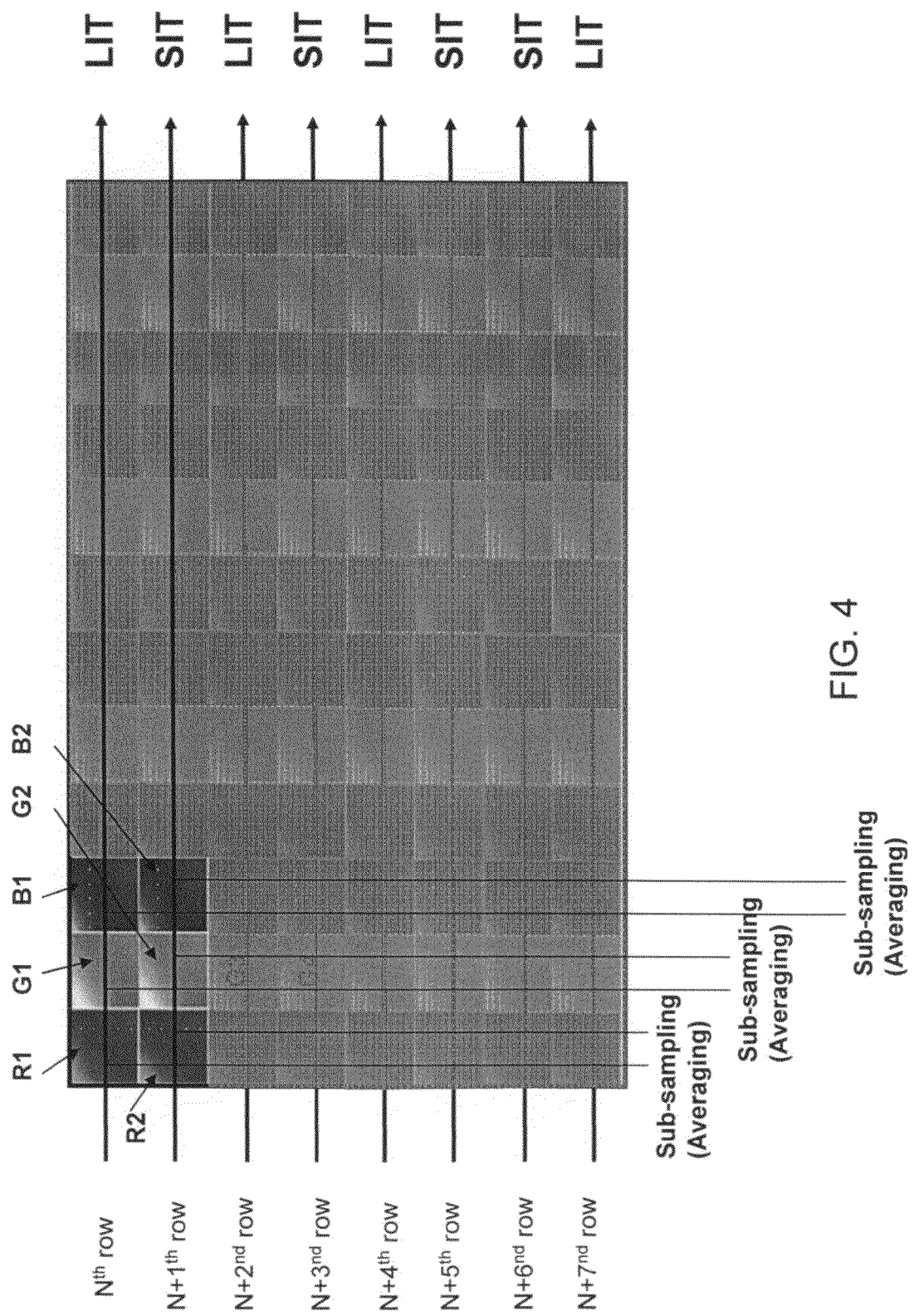
FIG. 4 illustrates row by row subsampling in a horizontal stripe pattern according to an embodiment.

An example of row by row subsampling using a LIT and a SIT, assuming the use of a stripe pattern in which same color pixels are arranged in columns, is illustrated in FIG. 4. As can be seen therein, pixels in adjacent rows having the same color and different integration times may be averaged. For example, a first green pixel G1 in the $N^{th}$ row having a LIT and a second green pixel G2 in the $N+1^{st}$ row having a SIT may be averaged. Similar averaging may be realized for blue and red pixels. While 2*2 subsampling is illustrated in FIG. 4, more than two rows may be sampled at once, e.g., 3*3, 4*4, etc., subsampling may be used.

Figure 5:
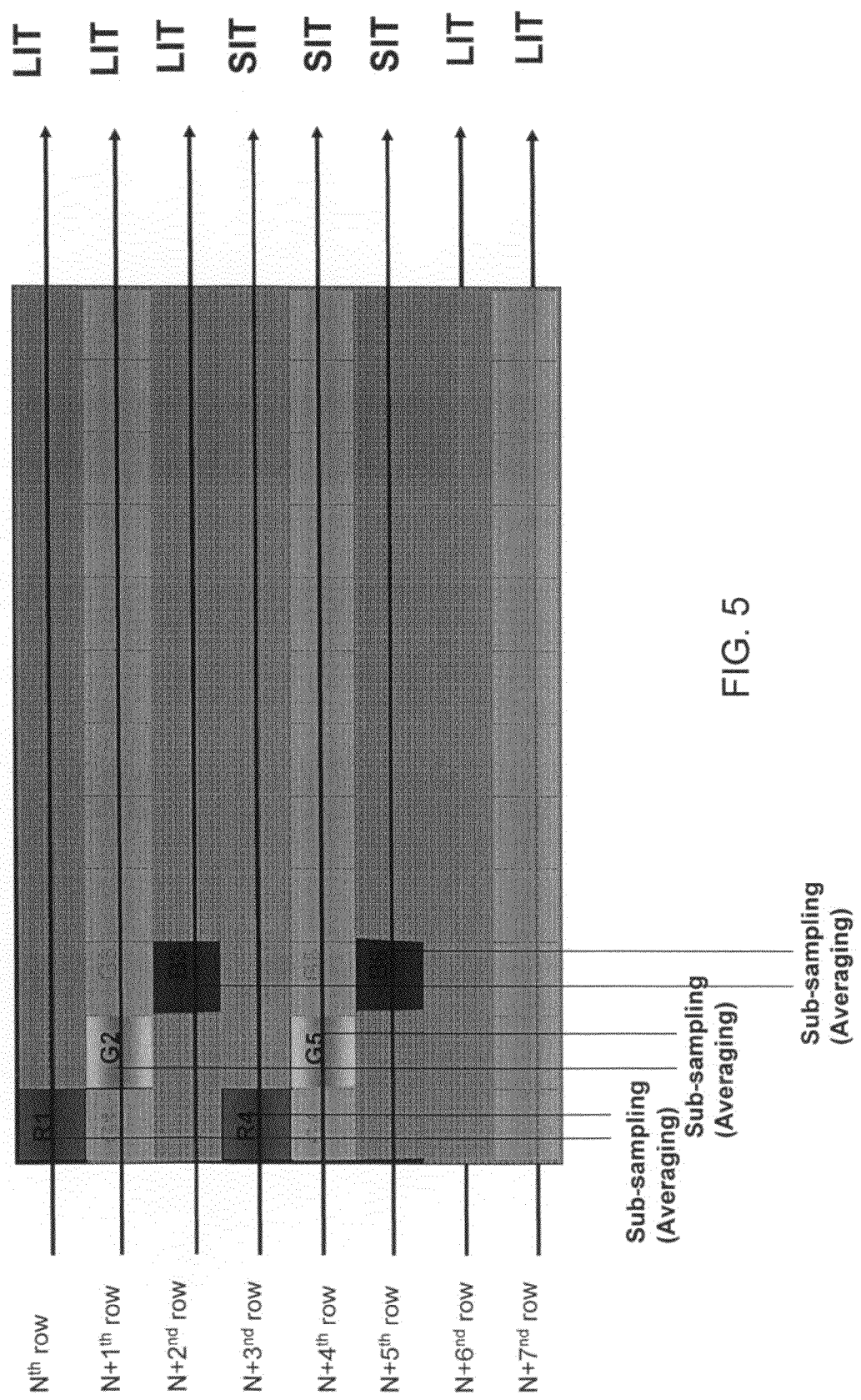
FIG. 5 illustrates row by row subsampling in a vertical stripe pattern according to an embodiment.

An example of row by row subsampling using a LIT and a SIT, assuming the use of a stripe pattern in which colors are arranged in rows, is illustrated in FIG. 5. As can be seen therein, pixels in nearest rows having the same color and different integration times may be averaged. For example, a first red pixel R1 in the $N^{th}$ row having a LIT and a second red pixel R4 in the $N+3^{rd}$ row having a SIT may be averaged. Similar averaging may be realized for blue and green pixels. While 2*2 subsampling is illustrated in FIG. 5, more than two rows may be sampled at once, e.g., 3*3, 4*4, etc., subsampling may be used.

Figure 6:
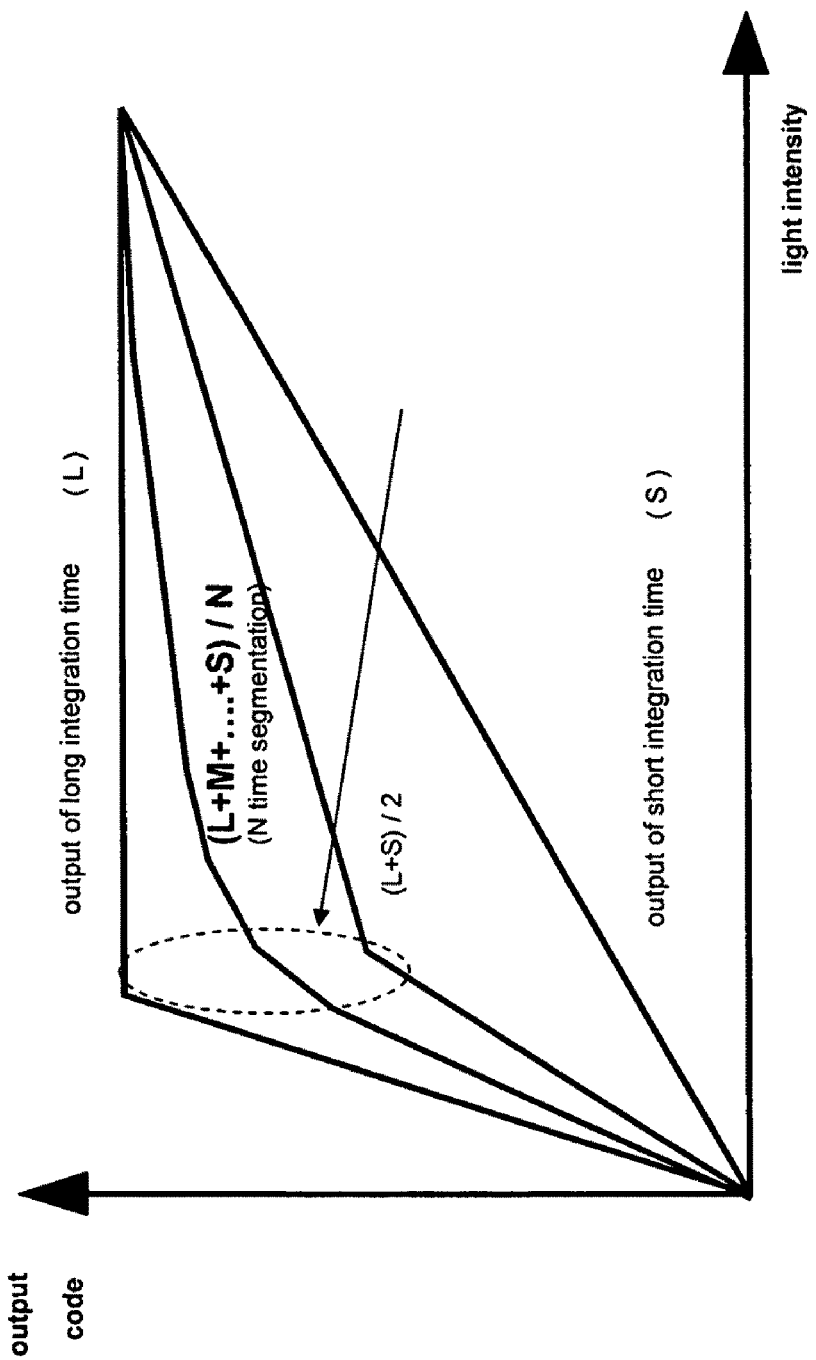
FIG. 6 illustrates image synthesis according to an embodiment.

In accordance with embodiments, subsampling groups may be row by row, rows by rows, pixel by pixel, pixels by pixels, and so forth, with different integration times for the groupings. FIG. 6 illustrates image synthesis using averaging of three different integration times, e.g., a LIT, a middle integration time (MIT), and a SIT. The dynamic range may controlled in accordance with the ratio of pixels sampled using a LIT, a MIT, and a SIT. In FIG. 6, the detailed elliptical region around the knee in the graph indicates where more color information is present. As can be seen therein, averaging multiple integration times, e.g., LIT, MIT and SIT, increases available color information as compared with averaging just two integration times, e.g., LIT and SIT.

Figure 7:
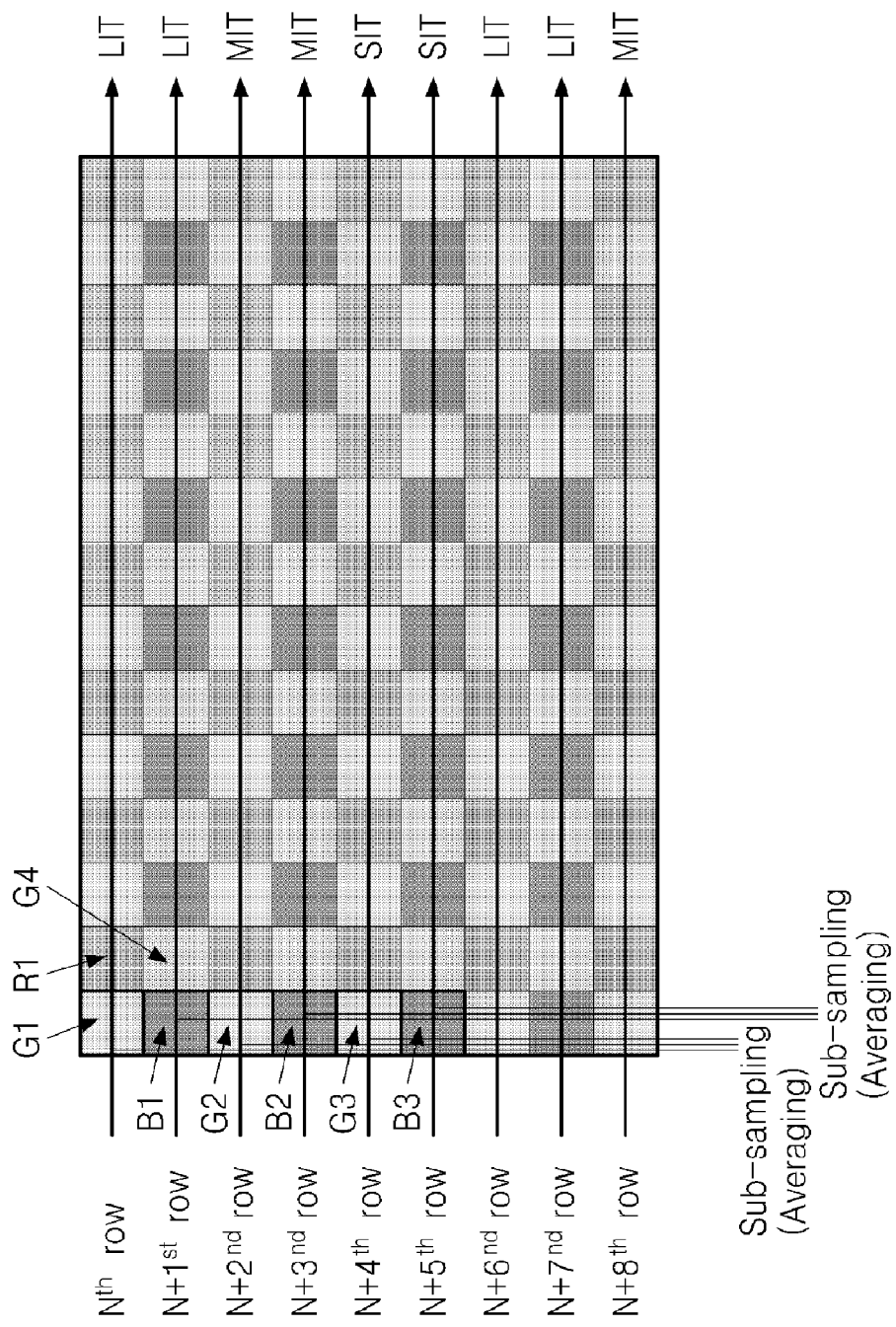
FIG. 7 illustrates row by row subsampling in a Bayer pattern according to an embodiment.

Further details of row by row subsampling for a Bayer pattern using three different integration times are illustrated in FIG. 7. As can be seen therein, nearest pixels of a same color in different rows and different integration times may be averaged. For example, a first green pixel G1 in the $N^{th}$ row having a LIT, a second green pixel G2 in the $N+2^{nd}$ row having a MIT, and a third green pixel G3 in the $N+4^{th}$ row having a SIT may be averaged. Similar averaging may be realized for the blue, red and second green pixels, the two green, one red and one blue pixels forming a Bayer pattern. While 3*3 subsampling is illustrated in FIG. 7, more than three rows may be sampled at once, e.g., 4*4, etc., subsampling may be used.

Figure 8:
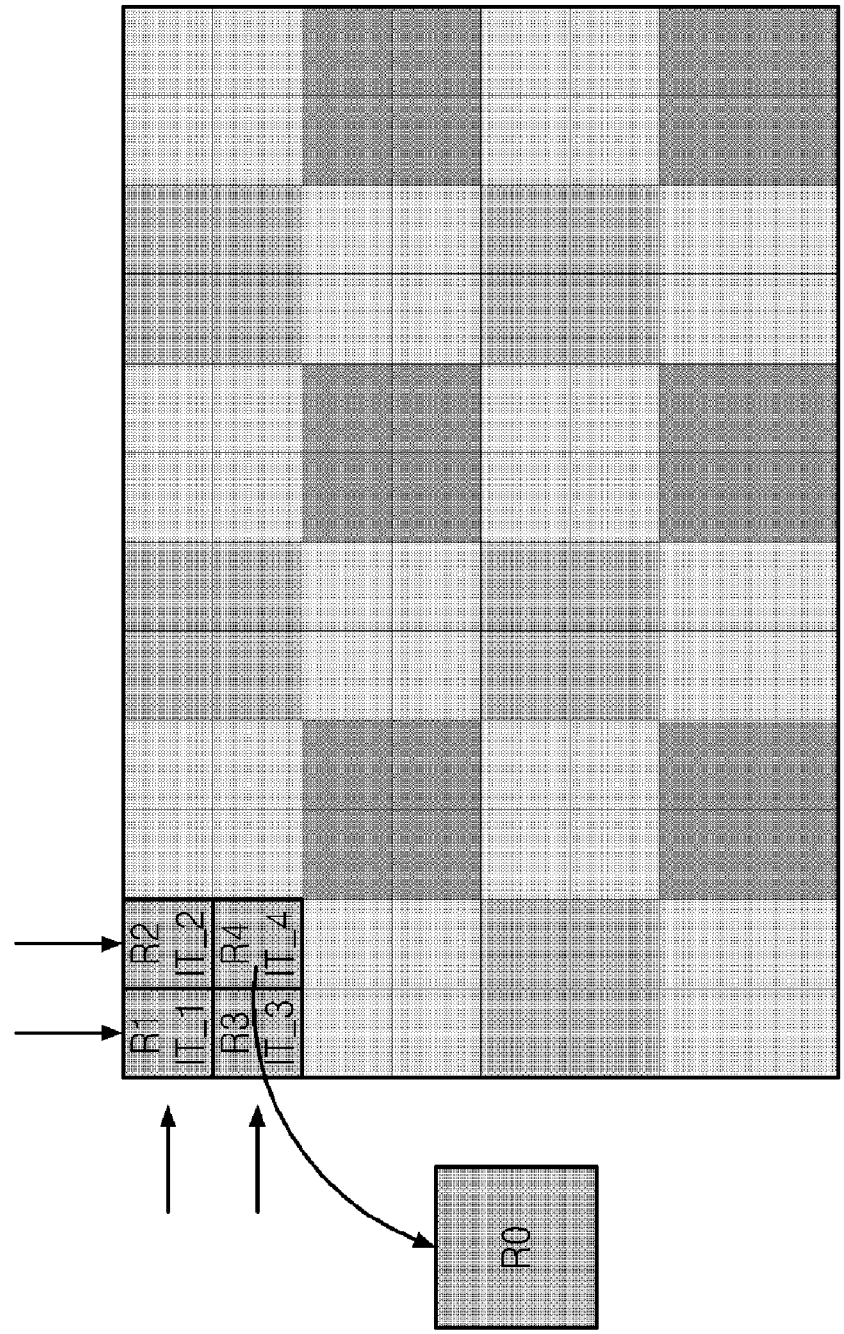
FIG. 8 illustrates sup-pixel subsampling in a Bayer pattern according to an embodiment.

Another example of multiple integration time control is illustrated in FIG. 8 in which intrapixel averaging is employed. As shown therein, a pixel may be made up of subpixels, e.g., four subpixels. Each pixel of a given color may be composed, e.g., four subpixels of the given color. For example, a zero-th red pixel R0 may include red subpixels R1 to R4. Each subpixels R1 to R4 may have a different integration time IT_1 to IT_4. The integration times IT_1 to IT_4 may all be different or some may be the same. For example, IT_1 and IT_2 may be LIT, IT_3 may be MIT, and IT_4 may be SIT, or IT_1 and IT_4 may be LIT, IT_2 may be MIT, and IT_3 may be SIT, and so forth. In addition to the intrapixel averaging illustrated in FIG. 8, sub-pixels in different pixels having the same color and different integration times may averaged, and/or a different number of sub-pixels than the number of subpixels within a pixel may be sampled and averaged. Further, pixels may be divided into more than four sub-pixels.

Figure 9:
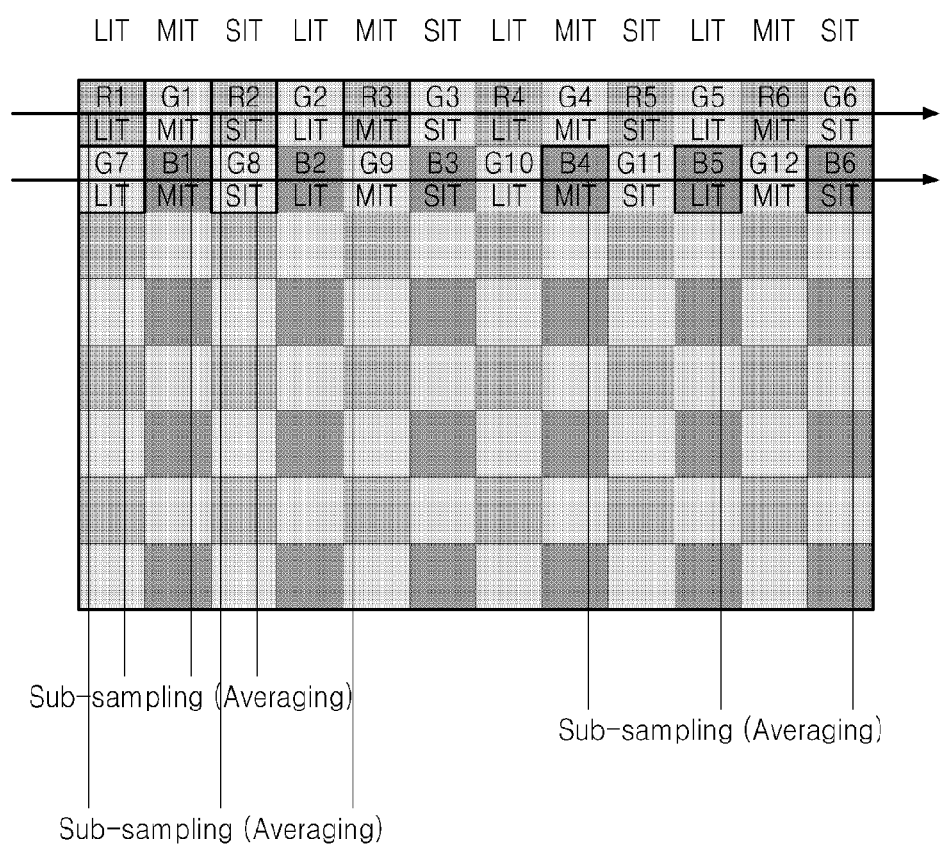
FIG. 9 illustrates pixel by pixel subsampling in a Bayer pattern according to an embodiment.

Another example of multiple integration time control is illustrated in FIG. 9 in which pixel by pixel averaging is employed. As shown therein, colors may be arranged in a Bayer pattern and integration times may vary by column. For example, a first red pixel R1 in the $N^{th}$ row having a LIT, a second red pixel R2 in the $N^{th}$ row having a MIT, and a third red pixel R3 in the $N^{th}$ row having a SIT may be averaged. Similarly, blue pixels in the $N+1^{st}$ row may be sampled and averaged. When arranged in a Bayer pattern, nearest green pixels having different integration times may not be in a same row. Thus, a first green pixel G1 in the $N^{th}$ having a MIT, a seventh green pixel G7 in the $N+1^{st}$ row having a LIT, and an eighth green pixel G8 in the $N+1^{st}$ row having a SIT may be averaged.

Figure 10:
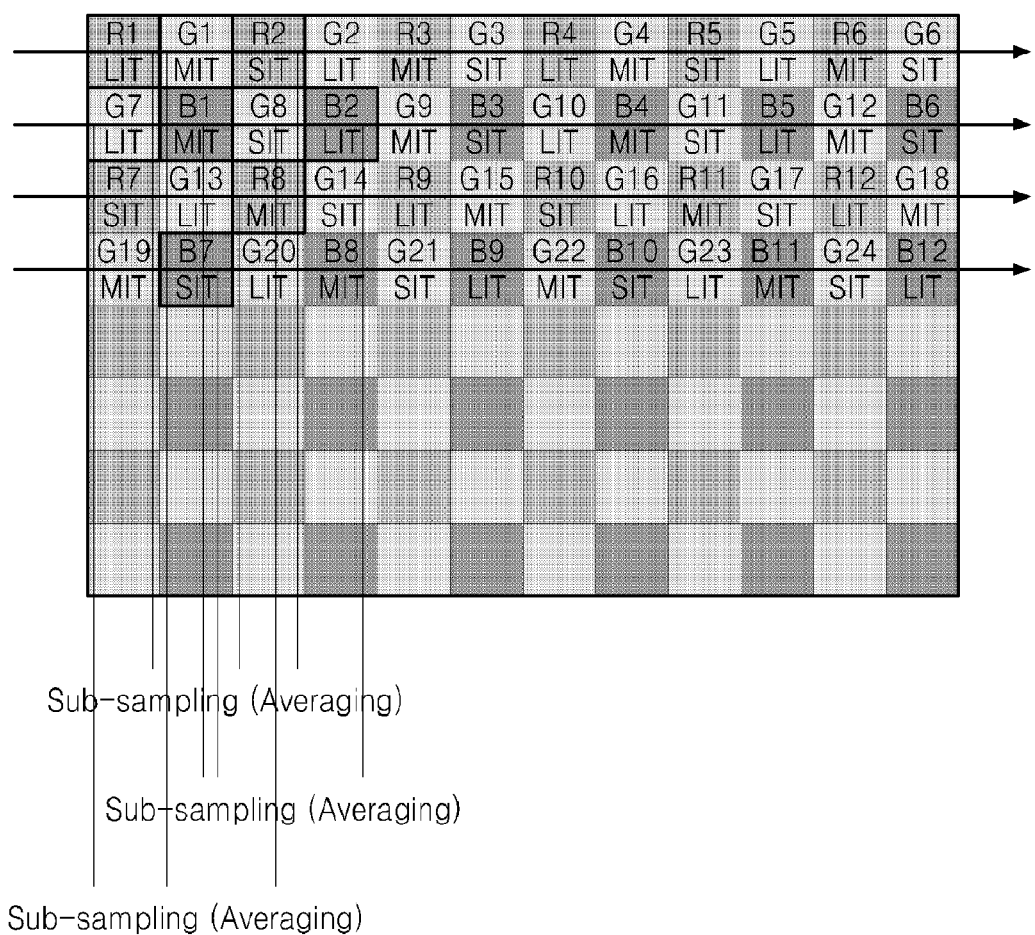
FIG. 10 illustrates pixel by pixel subsampling in a Bayer pattern according to an embodiment.

Another example of multiple integration time control is illustrated in FIG. 10 in which pixel by pixel averaging is employed. As shown therein, colors may be arranged in a Bayer pattern and integration times may vary by pixel. For example, a first red pixel R1 in the $N^{th}$ row having a LIT, a second red pixel R2 in the $N^{th}$ row having a SIT, and an eight red pixel R8 in the $N+2^{nd}$ row having a MIT may be averaged. Similarly, nearest blue and green pixels having different integration times may be averaged.

Figure 11:
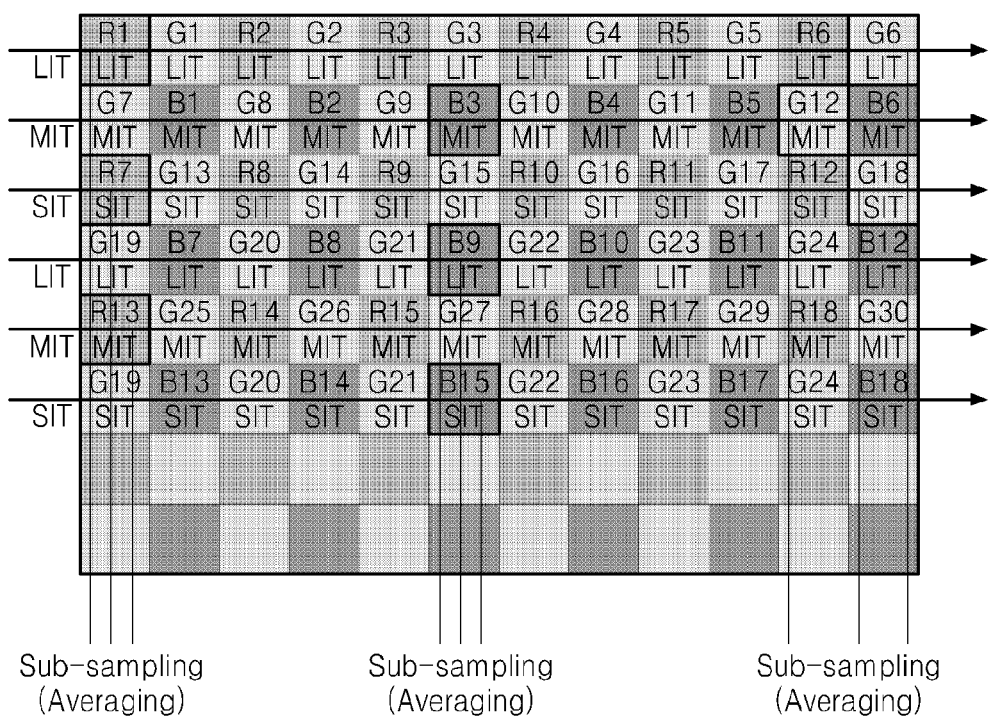
FIG. 11 illustrates row by row subsampling in a Bayer pattern according to an embodiment.

Another example of multiple integration time control is illustrated in FIG. 11 in which pixel by pixel averaging is employed. As shown therein, colors may be arranged in a Bayer pattern and integration times may vary by row. For example, a first red pixel R1 in the $N^{th}$ row having a LIT, a seventh pixel R7 in the $N+2^{nd}$ row having a SIT, and a thirteenth red pixel R13 in the $N+4^{th}$ row having a MIT may be averaged. Similarly, blue pixels in a same column and every other row may be sampled and averaged. When arranged in a Bayer pattern, nearest green pixels having different integration times may not be in a same column. Thus, a sixth green pixel G6 in the $N^{th}$ row having a LIT, a twelfth green pixel G12 in the $N+1^{st}$ row having a MIT, and an eighteenth green pixel G18 in the $N+2^{nd}$ row having a SIT may be averaged.

Figures 12A, 12B, 12C, 12D, 12E, 12F, 12G:
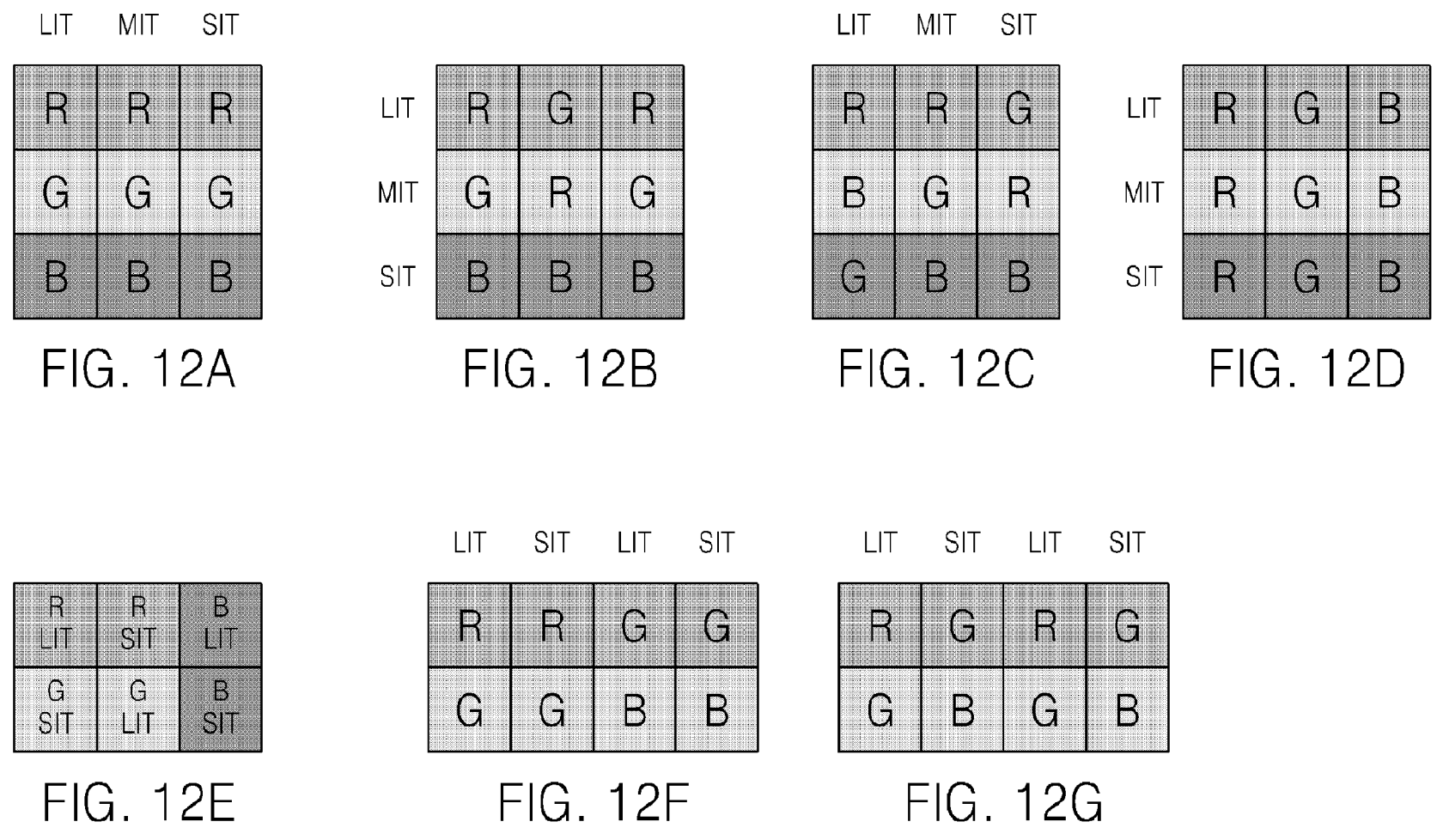

FIGS. 12A to 12G illustrate additional example embodiments having different arrangements of colors and integration times. FIGS. 12A to 12D illustrate arrangements when using three colors and three integration times, while FIGS. 12E to 12G illustrate arrangements when using three colors and two integration times.

As illustrated in FIG. 12A, colors may be arranged in rows and integration times may be arranged in columns. As illustrated in FIG. 12B, one color, e.g., blue (B), may be subjected to only one of the integration times, e.g., SIT. As illustrated in FIG. 12C, colors may be arranged in rows and integration times may be arranged in columns. As illustrated in FIG. 12D, colors may be arranged in columns and integration times may be arranged in rows. As illustrated in FIG. 12E, each color having different integration times may be arranged adjacent to each other, either in rows, e.g., as for R and G, or columns, e.g., as for B. As illustrated in FIG. 12F, each color having different integration times may be arranged adjacent to each other by row, while the different integration times alternate by row. As illustrated in FIG. 12G, the different integration times alternate by row, while the colors may be arranged in a Bayer pattern.

The embodiments noted above may be employed with a wide variety of systems, including an image pick-up apparatus, a processor system, and so forth. The embodiments may provide improved dynamic range within a single frame. Further, these systems may further control the subsampling such that a single integration time may be employed for an image having a low dynamic range, e.g., indoor images, while subsampling according to one or more aspects of the embodiments may be used for images having a higher dynamic range.

Figure 13:
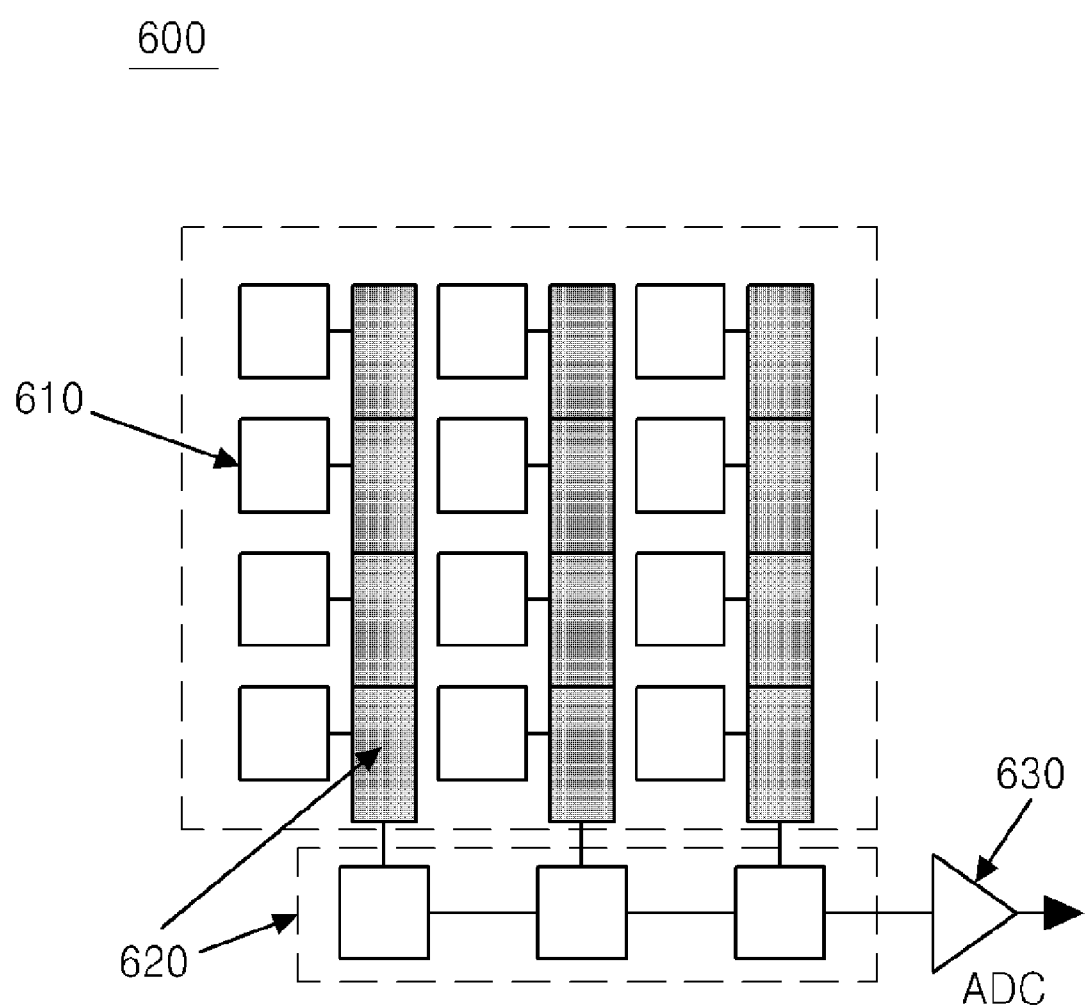
FIG. 13 illustrates a block diagram of an apparatus for image synthesizing in accordance with an embodiment.

FIG. 13 illustrates a block diagram of an image sensor 600 which may include a pixel array 610, which may be any of the embodiments noted above, a controller 620 and an ADC 630. The pixel array 610 may be configured to output a plurality of signals within one frame. The controller 620 may be configured to generate sub-sampled values using different integration times for the signals for each set, e.g., a set may be three colors or black and white. The ADC 630 may receive the sub-sampled values from the controller 620 and output corresponding digital signals. In the particular configuration illustrated in FIG. 13, the CCD uses interline data transfer, but other data transfer techniques, e.g., frame transfer and frame interline transfer, may be employed.

Figure 14:
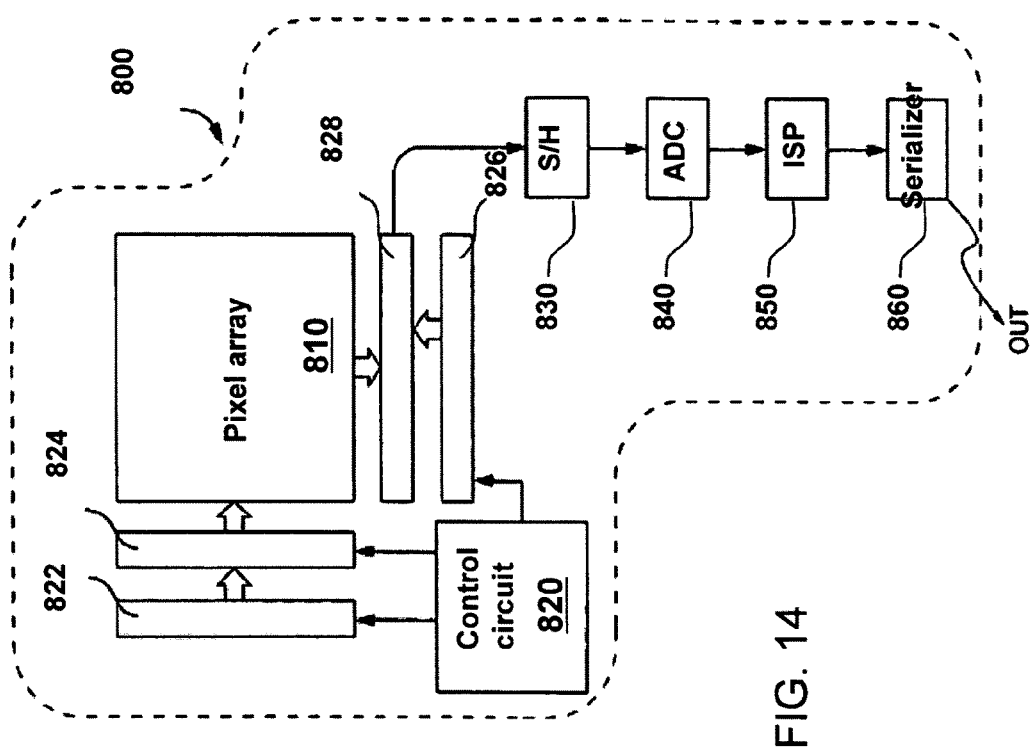
FIG. 14 illustrates a block diagram of an image pick-up in accordance with an embodiment.

FIG. 14 illustrates a block diagram of an image pick-up apparatus 800 according to an embodiment. The image pick-up apparatus 800 may include a pixel array 810, a control circuit 820, a sample and hold (S/H) unit 830, an analog-to-digital converter (ADC) 840, an image signal processor (ISP) 850 and a serializer 860.

The pixel array 810 may include a plurality of pixels arranged in a predetermined number of columns and rows. Pixels in each row may be turned on simultaneously, while pixels in each column may be selectively turned on.

The control circuit 820 may control an address decoder 822 and a column decoder 824 to select appropriate row and column lines for pixel readout. In response, a row driver 826 and a column driver/output 828 may apply driving voltages to drive transistors of selected row and column lines. Image data may then be output from the pixel array 810 from the selected column through the column driver/output 828 to the S/H unit 830. In turn, the S/H unit 830 may output the image data to the ADC 840.

The ISP 850 may receive digital image data from the ADC 840, in which the image synthesizing according to embodiments may be performed. This synthesized image data may then be output to the serializer 860.

Figure 15:
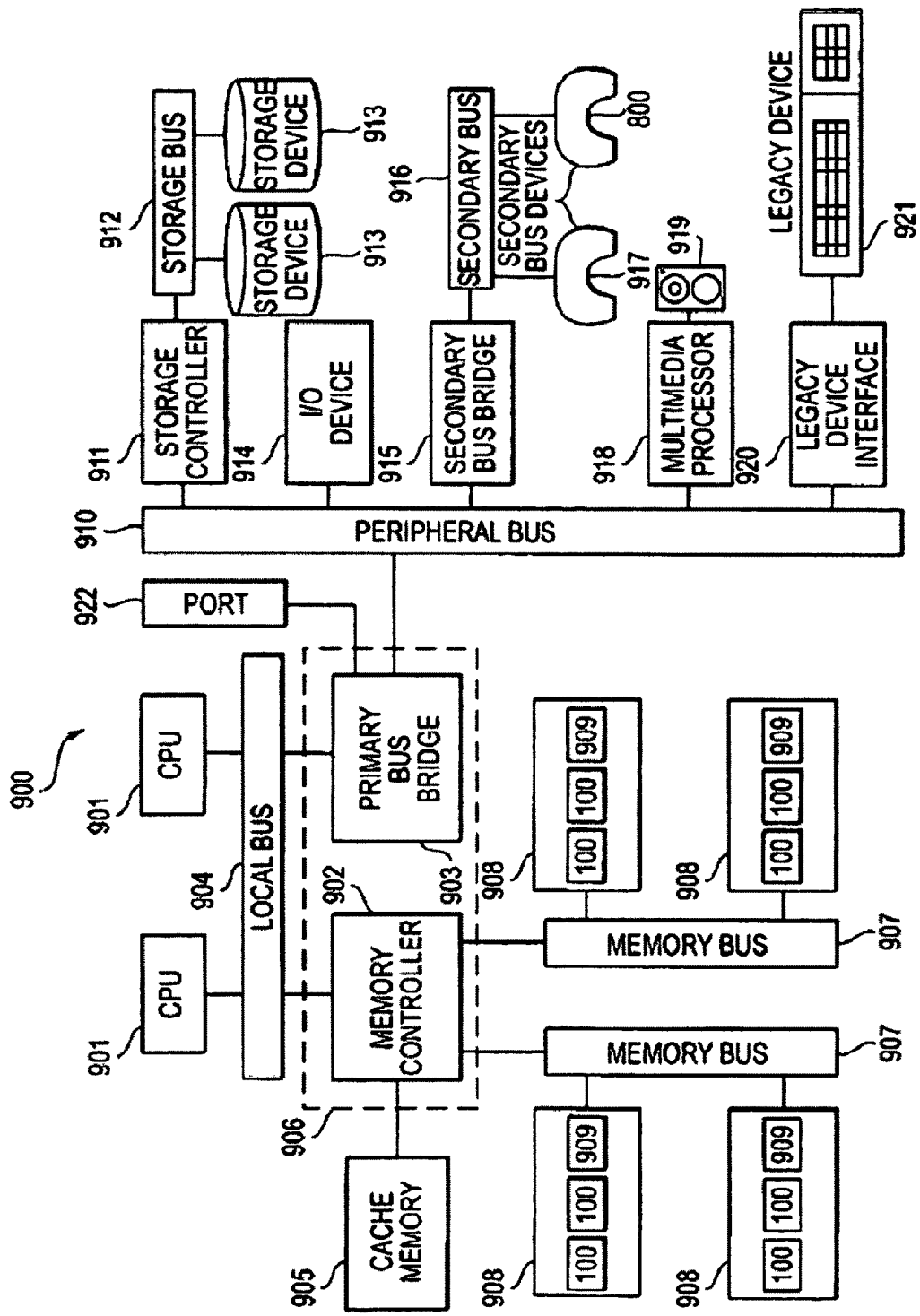
FIG. 15 illustrates a block diagram of a processor system in accordance with an embodiment.

FIG. 15 illustrates a block diagram of a processor system 900 in which embodiments may be employed. In particular, the processor system 900 may utilize the image pick-up device 800, which may be connected to a central processing unit (CPU) 901 or memory devices 100. The processor system 900 including the image pick-up device 800 may be, for example, Computer system/Camera system/Scanner/Machine vision system/Vehicle navigation system/video telephone/surveillance camera/Auto focus system/Star tracker system/Motion detection system/Image stabilization system/Medical imaging device/Data compression system for high-definition television, and so forth.

The processor system 900 may include one or more CPUs 901 coupled to a local bus 904. A memory controller 902 and a primary bus bridge 903 may be coupled the local bus 904. The processor system 900 may include multiple memory controllers 902 and/or multiple primary bus bridges 903. The memory controller 902 and the primary bus bridge 903 may be integrated as a single device 906. The memory controller 902 may also be coupled to one or more memory buses 907.

Each memory bus may accept memory components 908, each of which may include at least one memory device 100. The memory components 908 may be a memory card or a memory module, e.g., single inline memory modules (SIMMs) and dual inline memory modules (DIMMs). The memory components 908 may include one or more additional devices 909, e.g., a configuration memory, such as a serial presence detect (SPD) memory.

The memory controller 902 may also be coupled to a cache memory 905. The cache memory 905 may be the only cache memory in the processing system 900. Alternatively, other devices, e.g., processors 901 may also include cache memories, which may form a cache hierarchy with cache memory 905.

If the processing system 900 includes peripherals or controllers which are bus masters or which support direct memory access (DMA), the memory controller 902 may implement a cache coherency protocol. If the memory controller 902 is coupled to a plurality of memory buses 907, each memory bus 907 may be operated in parallel, or different address ranges may be mapped to different memory buses 907.

The primary bus bridge 903 may be coupled to at least one peripheral bus 910. Various devices, such as peripherals or additional bus bridges, may be coupled to the peripheral bus 910. These devices may include a storage controller 911, a miscellaneous I/O device 914, a secondary bus bridge 915, a multimedia processor 918, and a legacy device interface 920. The primary bus bridge 903 may also be coupled to one or more special purpose high speed ports 922. For example, when the processor system 900 is in a personal computer, the special purpose port 922 may be an accelerated graphics port (AGP), used to couple a high performance video card to the processor system 900.

The storage controller 911 may couple one or more storage devices 913, via a storage bus 912, to the peripheral bus 910. For example, the storage controller 911 may be a SCSI controller and storage devices 913 may be SCSI discs.

The I/O device 914 may be any sort of peripheral. For example, the 1/0 device 914 may be a local area network interface, such as an Ethernet card.

The secondary bus bridge 915 may be used to interface additional devices 917 via a secondary bus 916 to the processing system 900. For example, the secondary bus bridge 915 may be an universal serial port (USB) controller used to couple USB devices 917, including the image pick-up device 800 according to embodiments, via to the processing system 900.

The multimedia processor 918 may be a sound card, a video capture card, or any other type of media interface, which may also be coupled to additional devices, e.g., such as speakers 919. The legacy device interface 920 may be used to couple legacy devices, for example, older keyboards and mice, to the processing system 900.

The processing system 900 illustrated in FIG. 15 is only an exemplary processing system with which embodiments may be used. While FIG. 15 illustrates a processing architecture especially suitable for a general purpose computer, such as a personal computer or a workstation, it should be recognized that well known modifications can be made to configure the processing system 900 to become more suitable for use in a variety of applications. For example, electronic devices requiring processing may be implemented using a simpler architecture that relies on a CPU 901, coupled to memory components 908 and/or memory devices 100. These electronic devices may include, but are not limited to audio/video processors and recorders, gaming consoles, digital television sets, wired or wireless telephones, navigation devices (including system based on the global positioning system (GPS) and/or inertial navigation), and digital cameras and/or recorders, cellular phones, etc. The modifications may include, for example, elimination of unnecessary components, addition of specialized devices or circuits, and/or integration of a plurality of devices Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method of subsampling a plurality of signals from one frame of a pixel array within one frame, pixels within the pixel array belonging to one of at least two sets, each set being configured to sense value of a same image parameter, the method comprising:
controlling integration times for first and second signals for each set output from the pixel array, controlling including using a first integration time for the first signal of the set and using a second integration time, different than the first integration time, for the second signal of the set; and
generating a synthesized value from the first and second signals for each set output from the pixel array, the generating including calculating a sub-sampled value for each set using the first and second signals having different integration times for each set.

2. An imaging apparatus, comprising:
an array of pixels configured to output a plurality of signals within one frame, pixels within the pixel array belonging one of at least two sets, each set being configured to sense value of a same image parameter; and
a controller configured to generate a synthesized value from first and second signals for each set output from the pixel array, generation of the synthesized value includes using a first integration time for the first signal, using a second integration time, different than the first integration time, for the second signal, and calculating a sub-sampled value for each set from the first and second signals having different integration times for each set.

3. The imaging apparatus as claimed in claim 2, wherein each pixel includes a plurality of subpixels.

4. The imaging apparatus as claimed in claim 3, wherein at least two sub-pixels within a single pixel have different integration times.

5. The imaging apparatus as claimed in claim 3, wherein the controller is configured to control whether sub-pixels within each pixel have a same or different integration times in accordance with a dynamic range of an image incident on the pixel array.

6. The imaging apparatus as claimed in claim 3, wherein the first signal of the first set is output from a first sub-pixel and the second signal of the first set is output from a second sub-pixel.

7. The imaging apparatus as claimed in claim 6, wherein the first and second signal sub-pixels are within a same pixel.

8. The imaging apparatus as claimed in claim 2, wherein the first signal is output from a first pixel and the second signal is output from a second pixel.

9. The imaging apparatus as claimed in claim 2, wherein the controller is configured to select an integration time for each individual pixel.

10. The imaging apparatus as claimed in claim 2, wherein the controller is configured to select an integration time for each row in the pixel array.

11. The imaging apparatus as claimed in claim 2, wherein the controller is configured to select an integration time for each column in the pixel array.

12. The imaging apparatus as claimed in claim 3, wherein the image parameter is color.

13. The imaging apparatus as claimed in claim 2, wherein signals within each set are output from nearest portions of the pixel array.

14. The imaging apparatus as claimed in claim 2, wherein the controller is configured to average the first and second signals.

15. The imaging apparatus as claimed in claim 14, wherein the controller is configured to generate a weighted average the first and second signals.

16. The imaging apparatus as claimed in claim 2, wherein the controller is configured to use a third integration time for a third signal for each set, the third integration time being different than the first and second integration times.

17. The imaging apparatus as claimed in claim 2, wherein the controller is configured to control a ratio of signals sampled using the first integration time to signals sampled using the second integration time.

18. The imaging apparatus as claimed in claim 17, wherein the controller is configured to control the ratio is in accordance with a dynamic range of an image incident on the pixel array.

19. The imaging apparatus as claimed in claim 2, wherein the controller is configured to alter at least one of the first and second integration times in accordance with a dynamic range of an image incident on the pixel array.

20. The imaging apparatus as claimed in claim 2, wherein the first set is a first color and the second set is a second color different from the first color.

21. A system, comprising:
a processor;
a memory device in communication with the processor; and
an image sensor in communication with at least one of the processor and the memory device, the image sensor including,
a pixel array configured to output a plurality of signals within one frame, pixels within the pixel array belonging one of at least two sets, each set being configured to sense values of a same image parameter;
a controller configured to generate synthesized value from first and second signals for each set output from the pixel array, generation of the synthesized value includes using a first integration time for the first signal, using a second integration time, different than the first integration time, for the second signal, and calculating a sub-sampled value for each set from the first and second signals having different integration times for each set; and
an analog to digital converter configured to receive synthesized value from the controller and to output a corresponding digital signal to the one of the processor and memory device.

* * * * *